(12) United States Patent
Okada et al.

(10) Patent No.: US 9,328,271 B2
(45) Date of Patent: May 3, 2016

(54) ADHESIVE RESIN COMPOSITION AND MOLDED PRODUCTS

(75) Inventors: Yasunori Okada, Settsu (JP); Takashi Matsumoto, Settsu (JP); Takao Michinobu, Settsu (JP)

(73) Assignee: KANEKA CORPORATION, Osaka (JP)

( * ) Notice: Subject to any disclaimer, the term of this patent is extended or adjusted under 35 U.S.C. 154(b) by 532 days.

(21) Appl. No.: 13/641,182

(22) PCT Filed: Apr. 8, 2011

(86) PCT No.: PCT/JP2011/002095
§ 371 (c)(1),
(2), (4) Date: Jan. 2, 2013

(87) PCT Pub. No.: WO2011/129080
PCT Pub. Date: Oct. 20, 2011

(65) Prior Publication Data
US 2013/0108827 A1 May 2, 2013

(30) Foreign Application Priority Data

Apr. 16, 2010 (JP) .................................. 2010-095183
Nov. 10, 2010 (JP) .................................. 2010-252152
Mar. 18, 2011 (JP) .................................. 2011-061498

(51) Int. Cl.
| | | |
|---|---|---|
| *C08F 212/00* | (2006.01) | |
| *C09J 151/06* | (2006.01) | |
| *C08F 212/08* | (2006.01) | |
| *C08L 51/06* | (2006.01) | |
| *C08L 53/02* | (2006.01) | |
| *B32B 7/12* | (2006.01) | |
| *B32B 15/08* | (2006.01) | |
| *B32B 27/08* | (2006.01) | |
| *B32B 27/30* | (2006.01) | |
| *C08F 255/04* | (2006.01) | |
| *C08F 255/10* | (2006.01) | |
| *C08L 9/00* | (2006.01) | |

(52) U.S. Cl.
CPC ................ *C09J 151/06* (2013.01); *B32B 7/12* (2013.01); *B32B 15/08* (2013.01); *B32B 27/08* (2013.01); *B32B 27/302* (2013.01); *C08F 212/08* (2013.01); *C08F 255/04* (2013.01); *C08F 255/10* (2013.01); *C08L 51/06* (2013.01); *C08L 53/02* (2013.01); *C08L 9/00* (2013.01); *C08L 53/025* (2013.01); *Y10T 428/2419* (2015.01); *Y10T 428/24777* (2015.01); *Y10T 428/31507* (2015.04); *Y10T 428/31692* (2015.04); *Y10T 428/31757* (2015.04); *Y10T 428/31797* (2015.04); *Y10T 428/31913* (2015.04); *Y10T 428/31928* (2015.04)

(58) Field of Classification Search
CPC ...... C08F 212/08; C08F 255/04; C08L 51/06; C08L 53/02; C09J 151/06; B32B 27/32
See application file for complete search history.

(56) References Cited

U.S. PATENT DOCUMENTS

| | | | |
|---|---|---|---|
| 3,868,433 A | * | 2/1975 | Bartz et al. .................. 525/78 |
| 2008/0039583 A1 | | 2/2008 | Lee et al. |

FOREIGN PATENT DOCUMENTS

| | | |
|---|---|---|
| CN | 1555397 A | 12/2004 |
| CN | 1887999 A | 1/2007 |
| JP | 03-160083 A | 7/1991 |
| JP | 06-293845 A | 10/1994 |
| JP | 08-060121 A | 3/1996 |
| JP | 09-302319 A | 11/1997 |
| JP | 10-168417 A | 6/1998 |
| JP | 10-265751 A | 10/1998 |
| JP | 10-279774 A | 10/1998 |
| JP | 11-131037 A | 5/1999 |
| JP | 2003-002930 A | 1/2003 |
| JP | 2004-284575 A | 10/2004 |
| JP | 2004-292716 A | 10/2004 |
| JP | 2006-089626 A | 4/2006 |
| JP | 2007-169531 A | 7/2007 |
| JP | 2007-525562 A | 9/2007 |
| JP | 2008-163121 A | 7/2008 |
| JP | 2009-126922 A | 6/2009 |
| JP | 2010-500450 A | 1/2010 |
| JP | 2010-260998 A | 11/2010 |
| JP | 2011-102028 A | 5/2011 |
| WO | 03/025038 A2 | 3/2003 |
| WO | 2008/021154 A1 | 2/2008 |

OTHER PUBLICATIONS

International Preliminary Report on Patentability (Forms PCT/IB/373) (1 page) of International Application No. PCT/JP2011/002095 issued date Nov. 6, 2012; with form PCT/ISA/237 (4 pages).
International Search Report of PCT/JP2011/002095, mailing date Jun. 21, 2011.

* cited by examiner

*Primary Examiner* — Peter D Mulcahy
(74) *Attorney, Agent, or Firm* — Westerman, Hattori, Daniels & Adrian, LLP

(57) ABSTRACT

An adhesive resin composition, including: a base resin which comprises (A) 30-90 parts by weight of a modified ethylene-olefin copolymer, and (B) 70-10 parts by weight of a styrene thermoplastic elastomer, provided that (A)+(B) equals 100 parts by weight; and (C) a tackifier in an amount of 30-60 parts by weight per 100 parts by weight of the base resin, the modified ethylene-olefin copolymer being one which has been graft-modified with (a) an unsaturated carboxylic acid or a derivative thereof and (b) an aromatic vinyl monomer, comprises 0.1%-5% by weight of (a) the unsaturated carboxylic acid or the derivative thereof, and has a melting point peak in a range of 100-150° C. with an enthalpy of crystal fusion of 0.5-10 J/g as determined by DSC.

14 Claims, No Drawings

ADHESIVE RESIN COMPOSITION AND MOLDED PRODUCTS

TECHNICAL FIELD

The present invention relates to a hot melt adhesive, and more specifically, to a hot melt adhesive which is excellent in adhesion to low-adhesion materials such as polyolefin resins, acrylic resins, and polycarbonate resins.

BACKGROUND ART

Thermoplastic resins such as thermoplastic elastomers, olefin polymers, vinyl polymers, and engineering plastics are excellent in physical properties, moldability, surface characteristics, and the like. Thus, they can be processed into a mass, a sheet, a film or another shape according to the applications and are used in many fields such as automobiles, home electric appliances, electronics, buildings, and sundries. In order to provide a product having a desired shape or having upgraded performance or various functions, a plurality of molded articles of these resins are bonded together and combined. In particular, a method is widely used, which involves stacking a covering material or decorating sheet excellent in surface characteristics, weather resistance, and decorativeness on the outer layer of a resin molded article that is excellent in mechanical properties, as a base material. Such laminates are commonly used in automobile interiors, house interiors, housings of household electrical appliances, and the like. These laminates, however, generally have poor adhesion between the layers. Hence, in many cases, an adhesive layer is provided between layers before lamination. As the adhesive, solvent based adhesives and hot melt adhesives are used. However, solvent based adhesives are disadvantageous in that they tend to cause uneven coating and that they have harmful effects on environment and hygiene due to the use of organic solvents. Therefore, there is a need for hot melt adhesives which are easy to use and excellent in adhesion strength.

Examples of such hot melt adhesives that have been proposed include those which contain at least one base polymer selected from the group consisting of ethylene copolymers, styrene block copolymers, and olefin (co)polymers, together with a tackifier resin and a crystalline compound containing a polar group (Patent Literature 1), those which contain an amorphous poly-α-olefin, a tackifier resin, and a polypropylene wax as essential components (Patent Literature 2), those which are obtained by adding a tackifier resin component and a liquid plasticizer such as process oil to a styrene-ethylene-propylene-styrene block copolymer rubber or a styrene-butadiene-styrene block copolymer rubber (Patent Literatures 3 and 4), those which are obtained by mixing a modified polyolefin and a tackifier (Patent Literature 5), those which are obtained by mixing a styrene block copolymer and an acid modified wax (Patent Literature 6), those which are obtained by mixing an acid-modified polypropylene and an acid modified styrene block copolymer (Patent Literature 7), and those which are obtained by mixing a styrene block copolymer, a tackifier, and an ethylene polymer (Patent Literatures 8, 9, and 10).

Though the above-mentioned adhesives, which contain a styrene block copolymer or a polyolefin as a base polymer, generally have certain adhesion strength to polyolefins, they have poor adhesion to polar resins such as acrylic resins and polycarbonate resins. These hot melt adhesives actually cannot be used to bond molded articles of different thermoplastic resins together because these molded articles usually have different polarities from each other. If bonding is performed under pressure and heat at a relatively high temperature, the adhesion to polar resins can be enhanced in some cases. However, in the case of preparation of laminates for something requiring aesthetic quality, such as automobile interiors, house interiors, and housings of household electrical appliances, such a bonding process causes problems of damage to molded members reducing aesthetic quality. An adhesive having a reduced active temperature can be provided by using a base polymer having a low softening point and melting point for an adhesive. However, such a hot melt adhesive is less likely to have practical heat resistance at about 100° C. If the adhesive is used to bond a deep-drawn molded article such as those for automobile interiors as an adherend, it causes appearance problems exemplified by lateral slip of the covering material due to the expansion and contraction of the cover in a high temperature atmosphere. Thus, this adhesive is impractical. Meanwhile, if a polyamide, a polyester, or the like is used as an adhesive component, the adhesive itself can have heat resistance; however, it has insufficient adhesion to low-polarity resins such as polyolefins.

CITATION LIST

Patent Literature

Patent Literature 1: JP H10-168417 A
Patent Literature 2: JP 2004-284575 A
Patent Literature 3: JP H03-160083 A
Patent Literature 4: JP H08-60121 A
Patent Literature 5: JP H06-293845 A
Patent Literature 6: JP 2007-169531 A
Patent Literature 7: JP 2008-163121 A
Patent Literature 8: JP H11-131037 A
Patent Literature 9: JP H10-279774 A
Patent Literature 10: JP H10-265751 A

SUMMARY OF INVENTION

Technical Problem

Thus, an object of the present invention is to provide: an adhesive resin composition which shows sufficient adhesion both to polar materials and nonpolar materials in preparation of laminates for automobile interiors, house interiors, and housings of household electrical appliances even if the temperature during bonding is set low in consideration for aesthetic quality, can provide laminates satisfying the heat resistance required for particular applications, and has heat resistance at about 100° C.; a hot melt adhesive film formed from the adhesive resin composition; and a laminate prepared with the adhesive resin composition.

Solution to Problem

In the above context, the present inventors have made a keen examination and found that a resin composition containing a specific modified polyolefin, a styrene thermoplastic elastomer, and a tackifier can solve the problems. Thus, they have completed the present invention described below.

Specifically, the present invention includes the following aspects.

(1). An adhesive resin composition, essentially comprising: a base resin which comprises (A) 30 to 90 parts by weight of a modified ethylene-olefin copolymer, and (B) 70 to 10 parts by weight of a styrene thermoplastic elastomer, provided that (A)+(B) equals 100 parts by weight; and (C) a tackifier in an amount of 30 to 60 parts by weight per 100 parts by weight of the base resin, the modified ethylene-olefin copolymer being one which has been graft-modified with (a) an unsaturated carboxylic acid or a derivative thereof and (b) an aromatic vinyl monomer, comprises 0.1% to 5% by weight of (a) the unsaturated carboxylic acid or the derivative thereof, and has a melting point peak in a range of 100 to 150° C. with an enthalpy of crystal fusion of 0.5 to 10 J/g as determined by DSC.

(2). The adhesive resin composition according to (1), wherein the modified ethylene-α-olefin copolymer is obtained by modification of an ethylene-α-olefin copolymer having a density of 0.85 g/cm³ to 0.87 g/cm³.

(3). The adhesive resin composition according to (2), wherein the ethylene-α-olefin copolymer to be graft-modified is an ethylene-propylene copolymer.

(4). The adhesive resin composition according to (3), wherein the ethylene-propylene copolymer to be graft-modified has an ethylene content of 10% to 20% by weight.

(5). The adhesive resin composition according to any one of (1) to (4), wherein the styrene thermoplastic elastomer has a styrene content of 20% by weight or less.

(6). The adhesive resin composition according to any one of (1) to (5), wherein the styrene thermoplastic elastomer is at least one selected from the group consisting of hydrogenated styrene-isoprene block copolymers, hydrogenated styrene-butadiene block copolymers, and hydrogenated styrene-butadiene random copolymers.

(7). The adhesive resin composition according to any one of (1) to (6), wherein the tackifier has a ring and ball softening point of 90 to 160° C.

(8). A sheet- or film-shaped molded product, comprising the adhesive resin composition according to (1) to (7).

(9). A laminate, obtained by bonding at least one of the adhesive resin compositions according to (1) to (7) and/or the sheet- or film-shaped molded product according to (8) to at least one selected from the group consisting of polyolefin resins, styrene resins, polycarbonate resins, acrylic resins, polyamide resins, polyester resins, and metallic materials.

(10). The laminate according to (9), comprising a covering material and a molded article which are bonded together in contact with at least one of the adhesive resin compositions according to (1) to (7) and/or the sheet- or film-shaped molded product according to (8), the covering material being folded around an edge of the molded article toward the backside of the molded article.

(11). The laminate according to (9), wherein a covering material is bonded to a molded article having a curved edge by at least one of the adhesive resin compositions according to (1) to (7) and/or the sheet- or film-shaped molded product according to (8).

(12). The laminate according to (9), wherein a covering material is bonded to a molded article having a curved edge by at least one of the adhesive resin compositions according to (1) to (7) and/or the sheet- or film-shaped molded product according to (8), and wherein the covering material is folded around an edge of the molded article toward the backside of the molded article.

Advantageous Effects of Invention

The adhesive resin composition of the present invention ensures excellent adhesion both to nonpolar resins such as polyolefin resins and to polar resins such as acrylic resins and polycarbonate resins, which has been difficult to achieve. Since the adhesive can be used for bonding especially at low temperatures and low pressures, it can be used for lamination of a complex, three-dimensional shape molded article and a covering material through vacuum molding, vacuum pressure molding, hot-stamp molding, or the like. Thus, the adhesive can suitably be used for decoration of molded articles for automobile interiors, house interiors, and housings of household electrical appliances.

DESCRIPTION OF EMBODIMENTS

The present invention is described in detail below.

(1) Modified Ethylene-α-Olefin Copolymer

The term "modified ethylene-α-olefin copolymer" refers to an ethylene-α-olefin copolymer graft-modified with both an aromatic vinyl monomer and an unsaturated carboxylic acid or a derivative thereof. The modified ethylene-α-olefin copolymer used as the component (A) in the present invention contains 0.1% to 5% by weight of the unsaturated carboxylic acid or the derivative thereof, and has a melting point peak in a range of 100 to 150° C. with an enthalpy of crystal fusion of 0.5 to 10 J/g as determined by DSC. Generally, when hot melt adhesives are used, they are softened at the melting point or higher, bonded to something, and then cooled to the melting point or lower and solidified. Thus, if the bonding temperature is close to the required heat resistant temperature, it is difficult to design adhesives. However, when a modified ethylene-α-olefin copolymer meeting the above requirements is used, not only adhesion to low-adhesion resins can be ensured in bonding at low temperatures, but also heat resistance of the adhesive layer in the resulting laminate can be ensured.

Considering applications requiring heat resistance at about 100° C. such as automobile interiors, the melting point is in a range of 100 to 150° C., preferably 110 to 150° C., and more preferably 125 to 145° C. As a requirement for adhesion at bonding temperatures ranging from about 120 to 130° C. without causing reduction in heat resistance and degradation of the adherend, it is preferable to essentially have a melting point peak in a temperature range of 125 to 145° C. with an enthalpy of crystal fusion of 0.5 to 10.0 J/g, more preferably 1.0 to 5.0 J/g, and even more preferably 2.5 to 5.0 J/g. If the enthalpy of crystal fusion is larger than these values, the adhesive layer is insufficiently softened, resulting in insufficient adhesion. If the enthalpy of crystal fusion is smaller than 0.5 J/g or the copolymer has no melting point peak, the heat resistance of the adhesive layer is insufficient, and such a copolymer is not of practical use.

Such a modified ethylene-α-olefin copolymer can be easily obtained by modification of a copolymer of ethylene and α-olefin which has a density of 0.85 g/cm³ to 0.87 g/cm³. Examples of the α-olefin used to form the ethylene-α-olefin copolymer include α-olefins usually having 3 to 20 carbons such as propylene, 1-butene, 1-hexene, 4-methyl-1-pentene, 1-octen, 1-decene, 1-tetradecene, and 1-octadecene. Propylene is preferred because a radical is easily generated on the polyolefin during graft-modification, and from the view point of heat resistance. From the viewpoint of adhesion, random copolymers are more preferred. As for the content ratio of ethylene and propylene in the ethylene-propylene copolymer, it is preferable that the propylene content is 80% to 90% by weight and the ethylene content is 10% to 20% by weight. This ratio of ethylene and propylene enables the modified ethylene-propylene copolymer to have melting point properties shown in the present invention. If the ethylene content is more than the range, the ethylene-propylene copolymer has a problem of being of no practical use from the viewpoint of heat resistance because it has a high density and a reduced adhesion property at low temperatures or it shows insufficient enthalpy of crystal fusion. In addition, during modification, a cross-linking reaction more often occurs in ethylene units, which may lead to not only reduced adhesion at low temperatures, but also to a failure to provide a favorable appearance of the adhesive film. Conversely, if the ethylene content is less than the range, the enthalpy of crystal fusion tends to be increased and the adhesion at lower temperatures tends to be lowered.

The copolymer used for modification may contain another comonomer unit, such as other dienes and vinyl esters, as a third component, as long as it does not impair the above heat properties of the modified resin. A mixture of two or more of the modified ethylene-α-olefin copolymers may be used, or a mixture of two or more copolymers may be modified before use. These copolymers may be particles or pellets, and there is no particular restriction on their size and shape. The modified ethylene-α-olefin copolymer may be prepared by a usual radical grafting method such as a melt-kneading method, a method using a solution, and a suspension method. Among these, a melt-kneading method is preferred because it is economical, simple, and productive.

As a radical polymerization initiator, organic peroxides are generally used. For example, in terms of a high hydrogen-abstraction property, preferred examples include peroxy ketals such as 1,1-bis(t-butylperoxy)-3,3,5-trimethylcyclohexane, 1,1-bis(t-butylperoxy)cyclohexane, n-butyl-4,4-bis(t-butylperoxy)valerate, and 2,2-bis(t-butylperoxy)butane; dialkyl peroxides such as dicumyl peroxide, 2,5-dimethyl-2,5-di(t-butylperoxy)hexane, α,α'-bis(t-butylperoxy-m-isopropyl)benzene, t-butylcumyl peroxide, di-t-butyl peroxide, and 2,5-dimethyl-2,5-di(t-butylperoxy)hexyne-3; diacyl peroxides such as benzoyl peroxide; and peroxy esters such as t-butyl peroxyoctoate, t-butyl peroxyisobutyrate, t-butyl peroxylaurate, t-butyl peroxy-3,5,5-trimethyl hexanoate, t-butyl peroxyisopropyl carbonate, 2,5-dimethyl-2,5-di(benzoylperoxy)hexane, t-butyl peroxyacetate, and t-butyl peroxybenzoate, and di-t-butyl peroxyisophthalate. Two or more kinds of these may be used in combination. The amount of the radical polymerization initiator is preferably in the range of 0.01 to 10 parts by weight, and more preferably 0.05 to 5 parts by weight, per 100 parts by weight of the ethylene-α-olefin copolymer. If the amount is less than 0.01 parts by weight, modification may proceed insufficiently. If the amount is more than 10 parts by weight, the adhesion may be reduced because of increased gel content and reduced fluidity caused by the cross-linking reaction.

The unsaturated carboxylic acid and/or the derivative thereof (a) are not particularly limited. Examples thereof include anhydrides, amides, imides, and esters. These may be suitably used alone, or as a combination of two or more of these. Examples of the unsaturated carboxylic acid include acrylic acid, methacrylic acid, maleic acid, endo-bicyclo[2.2.1]-5-heptene-2,3-dicarboxylic acid (endic acid), fumaric acid, tetrahydrophthalic acid, itaconic acid, citraconic acid, crotonic acid, isocrotonic acid, and nadic acid. Specific examples of the derivative of the unsaturated carboxylic acid include malenyl chloride, maleimide, maleic anhydride, endic anhydride, methyl acrylate, acrylic acid amide, methyl methacylate, glycidyl methacrylate, methacrylic acid amide, citraconic anhydride, itaconic anhydride, nadic anhydride, monomethyl maleate, dimethyl maleate, monomethyl fumarate, and dimethyl fumarate. Among these unsaturated carboxylic acids or derivatives thereof, acrylic acid, methacrylic acid, maleic anhydride, and glycidyl methacrylate are preferred. More preferred are maleic anhydride and glycidyl methacrylate because these are inexpensive, and especially preferred is glycidyl methacrylate because it is easily removed in a drying step after modification.

The amount of (a) the unsaturated carboxylic acid and/or the derivative thereof is preferably 0.5 to 10 parts by weight per 100 parts by weight of the ethylene-α-olefin copolymer. If the amount is too small, the adhesion tends not to be improved sufficiently. If the amount is too large, increased amount of free non-grafted polymer tends to be by-produced, and also a sheet- or film-shaped adhesive composition to be obtained tends not to have a suitable shape or appearance. In order to increase the graft ratio of the unsaturated carboxylic acid and/or the derivative thereof, (b) an aromatic vinyl monomer is preferably added. Combining the aromatic vinyl monomer suppresses a reduction in mechanical properties caused by main-chain scission of the polyolefin and thus allows the adhesive composition to maintain heat resistance.

The aromatic vinyl monomer (b) is not particularly limited. It preferably has 4 to 20 carbons, and more preferably has 6 to 15 carbons. As such an aromatic vinyl monomer, for example, mention may be made of one or two or more of the following monomers: styrene; methylstyrenes such as o-methylstyrene, m-methylstyrene, p-methylstyrene, α-methylstyrene, β-methylstyrene, dimethylstyrene, and trimethylstyrene; chlorostyrenes such as o-chlorostyrene, m-chlorostyrene, p-chlorostyrene, α-chlorostyrene, β-chlorostyrene, dichlorostyrene, and trichlorostyrene; bromostyrenes such as o-bromostyrene, m-bromostyrene, p-bromostyrene, dibromostyrene, and tribromostyrene; fluorostyrenes such as o-fluorostyrene, m-fluorostyrene, p-fluorostyrene, difluorostyrene, and trifluorostyrene; nitrostyrenes such as o-nitrostyrene, m-nitrostyrene, p-nitrostyrene, dinitrostyrene, and trinitrostyrene; vinylphenols such as o-hydroxystyrene, m-hydroxystyrene, p-hydroxystyrene, dihydroxystyrene, and trihydroxystyrene; and divinylbenzenes such as o-divinylbenzene, m-divinylbenzene, and p-divinylbenzene; diisopropenylbenzenes such as o-diisopropenylbenzene, m-diisopropenylbenzene, and p-diisopropenylbenzene. Among these, styrene, methylstyrenes such as α-methylstyrene and p-methylstyrene, and divinylbenzene monomers or divinylbenzene isomer mixtures are preferred because these are inexpensive.

The amount of the aromatic vinyl monomer (b) is preferably 0.1 to 15 parts by weight, more preferably 0.5 to 10 parts by weight, and especially preferably 1 to 5 parts by weight, per 100 parts by weight of the ethylene-α-olefin copolymer. If the amount is too small, the graft ratio of the unsaturated carboxylic acid and/or the derivative thereof to the ethylene-α-olefin copolymer tends to be reduced. If the amount is more than 15 parts by weight, the graft efficiency of the unsaturated carboxylic acid and/or the derivative thereof may reach a saturation level, and also a cross-linking reaction may proceed excessively, which may lead to reduced adhesion.

Regarding the addition order and method for melt-kneading, the addition order is preferably as follows. The ethylene-α-olefin copolymer and the radical polymerization initiator are melt-kneaded to give a mixture. Then, to the mixture is added the unsaturated carboxylic acid and/or the derivative thereof, or the aromatic vinyl monomer, and they are melt-kneaded. This addition order leads to reduced generation of low molecular weight products that are not involved in grafting. The order and method for mixing or melt-kneading of other materials added as needed are not particularly limited.

The heating temperature during melt-kneading is preferably 150 to 240° C., because the ethylene-α-olefin copolymer melts sufficiently and excessive thermal decomposition or cross-linking reaction is prevented when the temperature is in the range. The time period during melt-kneading (time period after adding the radical polymerization initiator) is typically 30 seconds to 60 minutes.

Examples of apparatus usable for the melt-kneading include single or multiple screw extruders, Banbury mixers, Plastomills, and heating roll kneaders. From the viewpoint of productivity, a single or twin screw extruder equipped with a decompression device is preferably used. Here, in order to mix the materials sufficiently uniformly, the melt-kneading may be repeated multiple times.

(2) Styrene Thermoplastic Elastomer

The styrene thermoplastic elastomer as the component (B) in the present invention refers to a thermoplastic elastomer which contains styrene, a homologue thereof, or an analogue thereof. Any of known styrene thermoplastic elastomers can be used without particular limitation. Specific examples thereof include block copolymers which contain a block of styrene, a homologue thereof, or an analogue thereof as at least one end block and concurrently contain an elastomer block of a conjugated diene or a hydrogenated product thereof as at least one middle block; and random copolymers of an aromatic vinyl compound and a conjugated diene compound.

Preferred specific examples of the styrene thermoplastic elastomer in the present invention include styrene-butadiene diblock copolymers, styrene-butadiene triblock copolymers, styrene-isoprene diblock copolymers, styrene-isoprene triblock copolymers, hydrogenated styrene-butadiene diblock copolymers, hydrogenated styrene-butadiene triblock copolymers, hydrogenated styrene-isoprene diblock copolymers, hydrogenated styrene-isoprene triblock copolymers, and hydrogenated styrene-butadiene random copolymers. The styrene block may contain a copolymer of styrene and an aromatic vinyl compound such as α-methylstyrene, in addition to styrene. The styrene content is preferably 20% by weight or less, and more preferably 10% to 15% by weight. If the styrene content is more than the range, the adhesion strength tends to be reduced unfavorably.

Among these styrene thermoplastic elastomers, from the viewpoint of good heat resistance and weather resistance, preferred are those in which part or all of the unsaturated double bonds in the polymer block(s) mainly derived from the conjugated diene are hydrogenated. Examples thereof include hydrogenated styrene-isoprene triblock copolymers (SEPS), hydrogenated styrene-butadiene triblock copolymers (SEBS), and hydrogenated styrene-butadiene random copolymers (HSBR). Hydrogenated styrene-butadiene random copolymers (HSBR) are especially preferred because they are excellent in compatibility with the modified ethylene-α-olefin copolymer and the tackifier, and adhesion at low temperatures. Examples of commercially available styrene thermoplastic elastomers as mentioned above include Asaprene, Tufprene, Asaflex (produced by Asahi Kasei Chemicals Corp.); Dynaron, JSR-TR (produced by JSR Corporation); Kraton (produced by Kraton Performance Polymers, Inc.); Quintac (Zeon corporation); Hybrar, and Septon (produced by Kuraray Co., Ltd.). Each of these commercialized products may be used alone, or two or more of these may be used in combination.

(3) Tackifier

The tackifier as the component (C) refers to a tackifier which has a ring and ball softening point of 90° C. or more, and preferably 100 to 170° C. Those which have a ring and ball softening point of 130 to 160° C. are more preferred because both adhesion at low temperatures and heat resistance can then be easily ensured. The tackifier may be appropriately selected according to the bonding temperature and the heat resistant temperature. If the softening point is lower than 90° C., the heat resistance of the adhesive composition is reduced, and at the same time melt-kneading of such a tackifier with the styrene thermoplastic elastomer and the ethylene-α-olefin copolymer is difficult. As the tackifier, various tackifiers can be used and examples thereof include petroleum resins (e.g. aliphatic, alicyclic, and aromatic ones), terpene resins (polymers of α-pinene, β-pinene, limonene or the like), aromatic hydrocarbon-modified terpene resins, rosin resins (e.g. gum rosin, tall oil rosin, wood rosin, hydrogenated rosin, disproportionated rosin, polymerized rosin, maleinized rosin, rosin ester), and terpene phenol resins. Each of these may be used alone, or two or more of these may be used in combination.

(4) Method of Preparing Adhesive Resin Composition

As for the method of preparing the adhesive resin composition of the present invention, any of known methods can be used for mixing (A) the modified ethylene-α-olefin copolymer, (B) the styrene thermoplastic elastomer, and (C) the tackifier. Melt-kneading is especially preferred since the components are easily mixed uniformly by this method. Examples of apparatus usable for melt-kneading include single or multiple screw extruders, Banbury mixers, Plastomills, heating roll kneaders, and the like. From the viewpoint of productivity, a single or twin screw extruder equipped with a decompression device is preferably used. Here, in order to mix the materials uniformly, the melt-kneading may be repeated multiple times. As for the content ratio of the components, the content of the tackifier is 30 to 60 parts by weight relative to the base resin containing 30 to 90 parts by weight of (A) the modified ethylene-α-olefin copolymer and 70 to 10 parts by weight of (B) the styrene thermoplastic elastomer, provided that (A)+(B) equals 100 parts by weight. More preferably, the content of (A) the modified ethylene-α-olefin copolymer is 60 to 80 parts by weight, and the content of (B) the styrene thermoplastic elastomer is 40 to 20 parts by weight. If the components are formulated in the ratio, the adhesive resin composition can have heat resistance due to a crystal structure derived from the polyethylene-α-olefin, and at the same time sufficient wettability on the adherend in bonding is ensured.

The adhesive resin composition of the present invention may contain another thermoplastic resin, and polyethylene-α-olefins having a melting point of 100° C. or more are preferred in terms of preventing a reduction in heat resistance and adhesion. If the content of the tackifier, the component (C), is less than 30 parts by weight, the wettability on the adherend is poor and the adhesion is reduced. If the content is more than 60 parts by weight, the composition is less cohesive and thus the adhesion and the heat resistance are reduced. Also in this case, the tackiness of the adhesive resin composition is too high, leading to difficulty in granulation and handling during molding. The modified ethylene-α-olefin copolymer as the component (A) is used as a part of the base resin and itself contributes to adhesion at low temperatures. In addition, whether the tackifier used is nonpolar, such as petroleum resins and terpene resins, or it contains a polar group, such as rosin resins and terpene phenol resins, the modified ethylene-α-olefin copolymer enhances the compatibility of the tackifier with the base resin. Thus, adhesion to polar resin can be effectively ensured. The content of the unsaturated carboxylic acid and/or the derivative thereof in the modified ethylene-α-olefin copolymer is preferably 0.1% to 5% by weight based on 100% by weight of the base resin. If the content is less than 0.1% by weight, the adhesion is insufficient. If the content is more than 5% by weight, graft chains are allowed to react and partially cross-linked during melt-kneading. This leads to poor moldability, deteriorated appearance of the product due to fish eyes, marks and the like, and reduced adhesion.

The adhesive resin composition may contain, as necessary, stabilizers such as antioxidants, metal deactivators, phosphorus-containing processing stabilizers, ultraviolet absorbers, ultraviolet stabilizers, fluorescent bleaches, metal soaps, and antacid adsorbents, as well as other additives such as cross-linking agents, chain transfer agents, nucleating agents, lubricants, plasticizers, fillers, reinforcements, pigments, dyes, flame retardants, and antistatic agents, as long as they do not impair the effects of the present invention.

In the case of using these stabilizers and additives, these may be previously added to the styrene thermoplastic elastomer or to the ethylene-α-olefin copolymer, or may be added during melt-modifying these components, or may be added during melt-kneading the components (A) and (B), which are the base resin, and the tackifier, or may be added by an appropriate method after an adhesive resin composition is prepared.

(5) Method of Preparing Sheet- or Film-Shaped Molded Product

The adhesive resin composition of the present invention can be formed into a sheet- or film-shaped molded product having heat weldability. The thickness is not particularly limited, and is typically about 30 to 300 μm. The heat weldability herein means that the ability to melt by heat and bond to an adherend. The method of preparing the sheet- or film-shaped molded product having heat weldability according to the present invention is not particularly limited. For example, after the adhesive resin composition of the present invention is obtained by melt-kneading, it may be molded and processed into a molded sheet by various extruders, injection molding machines, calender molding machines, inflation molding machines, roll formers, and hot press molding machines.

(5) Laminate Containing Adhesive Resin Composition of Invention

By using the adhesive resin composition of the present invention, various base materials can be bonded at relatively low treatment temperatures to provide multi-layer laminates. Examples of materials which may be contained in the laminate of the present invention include, for example, cellulosic polymer materials such as paper, cotton, linen, cloth, and wooden boards; synthetic polymer materials such as polyolefin resins such as polypropylene and polyethylene, styrene resins such as polystyrene, styrene-butadiene block copolymers (SBS resin), styrene-acrylonitrile copolymers (AS resin), acrylonitrile-ethylene/propylene-styrene copolymers (AES resin), and acrylonitrile-butadiene-styrene copolymers (ABS resin), polycarbonate resins, (meth)acrylic resins, polyester resins, polyamide resins such as nylon and polyurethane, phenol resins, and epoxy resins; and metallic materials such as gold, silver, copper, iron, tin, lead, and aluminum. Two or more different materials for base materials may be mixed or combined. In the case that the laminate is formed by bonding two different adherends via the adhesive film of the present invention, the materials of the two base materials may be the same as or different from each other. Though the hot melt adhesive film of the present invention provides strong adhesion without requiring any special surface treatment of the base material, surface treatment such as surface modification by plasma, laser or the like, surface oxidation, and etching may be applied as necessary.

Specific examples of suitable applications of the laminate of the present invention include, but not particularly limited, those in which a covering material and a molded article are used as base materials, such as interior materials for automobiles and the like (e.g. ceiling materials for automobile interiors, door components for automobile interiors, dashboard components for automobile interiors, instrument panels), components for home electric appliances (e.g. housings for personal computers, frames of flat-screen televisions), and housing materials (e.g. interior wall boards, decorative films). The covering material used here has been formed into a film, a sheet, a foam, any unwoven material, or a woven material. Examples thereof include decorating sheets made of polymers such as polyvinyl chloride, various polyolefins, and ABS, polyester non-woven fabrics, raised knits, fabrics, polyurethane artificial leathers, and polyolefin foams formed mainly of polypropylene, polyethylene, polybutylene, or a copolymer of these olefins. Examples of the molded article used include injection-molded articles of various polymer materials such as ABS, PC/ABS, polyolefins, glass fiber-reinforced polyolefins, and glass fiber-reinforced nylons; and ligneous molded articles and ligneous boards prepared by encasing wood chips, ligneous powder or the like in a thermosetting resin or a polyolefin resin through hot press molding.

The adhesive resin composition of the present invention can provide strong adhesion at relatively low temperatures of about 130° C., and does not damage the texture, feel and the like of the materials of the covering material and the molded article in the preparation process. Thus, the adhesive resin composition can be suitably used for decoration of molded articles in which a decorating sheet is used as a covering material.

The sheet- or film-shaped adhesive resin composition of the present invention is suitably used for preparing the laminate containing a cover and a molded article. For preparing the multi-layer laminate according to the present invention, various forming methods such as heat lamination, vacuum molding, vacuum pressure molding, hot pressing, heat rolling and hot-stamp molding can be used. Among these, vacuum molding, vacuum pressure molding, and hot-stamp molding are preferred because these can be used for bonding a covering material to a molded article having a curved edge. The molded article having a curved edge denotes, among molded articles as made of the above-mentioned materials, one which has a planar circular arc-shaped surface as the surface to be bonded to a covering material. Such a molded article may form a shape skeleton in automobile interiors, and housings of home electrical appliances. The method of preparing the laminate may include, for example, heat laminating the adhesive film to a covering material and then subjecting the resultant laminate to a particular molding process. By this method, the covering material can be laminated so that it can conform to the shape of the molded article. Hot pressing and heat rolling are disfavored since these may damage the circular arc shape of the molded article. In vacuum pressure molding, in particular, the covering material can be folded around an edge of the molded article toward the backside of the molded article by applying pressure while bonding the cover to the molded article. Further, vacuum pressure molding can also be used to prepare a laminate containing a deep-drawn molded article as an adherend.

In the case that vacuum molding, vacuum pressure molding, or hot-stamp molding is used, from the viewpoint of the conformance of the covering material to the molded article, the adhesive film preferably has a thickness of 25 to 100 μm, and more preferably 30 to 70 μm. If the thickness is thinner than 25 μm, the film has a smaller adhesive area to the molded article and unfavorably shows insufficient adhesion strength. If the thickness is thicker than 100 μm, the film has a reduced thermal conductivity and thereby does not sufficiently soften within a predetermined time during heating of the covering material, which leads to a reduction in adhesion strength.

When the film has the above thickness, a laminate with a favorable appearance can be obtained, and at the same time the occurrence of poor appearance such as peeling and lateral slip of the covering material, caused by expansion and contraction of the covering material or the molded article when the laminate is placed in a high temperature environment, can be suppressed. In the laminate obtained by vacuum pressure molding, the covering material is folded around an edge of the molded article toward the backside thereof. Thus, the appearance can be maintained in higher temperature environment.

EXAMPLES

In the following, the present invention is described in more detail based on specific examples and comparative examples. The present invention, however, is not limited to the examples. In the examples and comparative examples, "part(s)" and "%" mean "part(s) by weight" and "% by weight," respectively.

(Analysis of Glycidyl Methacrylate Content in Modified Ethylene-α-Olefin Copolymer)

A modified ethylene-propylene copolymer pellet prepared was dissolved in chlorobenzene heated to 110° C. Then, the chlorobenzene solution was added dropwise to acetone to give a precipitate. The glycidyl methacrylate content was measured by titration of the precipitate thus obtained.

(DSC Measurement of Modified Ethylene-α-Olefin Copolymer)

Using a differential scanning calorimeter (DTG-50, produced by Shimadzu Corporation), a test sample under argon atmosphere was warmed to 240° C. at 20° C./minute and immediately cooled to not more than 40° C. After that, the sample was warmed again to 240° C. at 20° C./minute. The temperature at the top of a peak observed on a melting endotherm curve obtained during these temperature changes was determined as a melting point (Tm), and the enthalpy of fusion thereof was shown as ΔH (J/g).

(Preparation 1)

100 parts of an ethylene-propylene copolymer (Vistamaxx 6202, ethylene content: 15% by weight, density: 0.861 g/cm$^3$, produced by Exxon Mobil Corporation) and 0.5 parts of 1,3-di(t-butylperoxyisopropyl)benzene (one-minute half-life temperature: 175° C.) were fed into a twin screw extruder (product name: TEX44XCT, 44 mmφ, L/D=38.5, produced by The Japan Steel Works, Ltd.) set at a cylinder temperature of 200° C. and a revolution of 150 rpm and subjected to melt-kneading. Then, 5 parts of glycidyl methacrylate and 5 parts of styrene were added from an inlet in the middle of the cylinder, and the resultant mixture was subjected to melt-kneading to provide a modified ethylene-propylene copolymer A. Table 1 shows properties of the obtained modified ethylene-propylene copolymer A.

(Preparation 2)

100 parts of an ethylene-propylene copolymer (Versify V 3401.05, ethylene content: 15% by weight, density: 0.863 g/cm$^3$, produced by The Dow Chemical Company) and 0.5 parts of 1,3-di(t-butylperoxyisopropyl)benzene (one-minute half-life temperature: 175° C.) were fed into a twin screw extruder (product name: TEX44XCT, 44 mmφ, L/D=38.5, produced by The Japan Steel Works, Ltd.) set at a cylinder temperature of 200° C. and a revolution of 150 rpm and subjected to melt-kneading. Then, 5 parts of glycidyl methacrylate and 5 parts of styrene were added from an inlet in the middle of the cylinder, and the resultant mixture was subjected to melt-kneading to provide a modified ethylene-propylene copolymer B. Table 1 shows properties of the obtained modified ethylene-propylene copolymer B.

(Preparation 3)

100 parts of an ethylene-butene copolymer (Tafmer BL3450, ethylene content: 17% by weight, density: 0.900 g/cm$^3$, produced by Mitsui Chemicals, Inc.) and 0.5 parts of 1,3-di(t-butylperoxyisopropyl)benzene (one-minute half-life temperature: 175° C.) were fed into a twin screw extruder (product name: TEX44XCT, 44 mmφ, L/D=38.5, produced by The Japan Steel Works, Ltd.) set at a cylinder temperature of 200° C. and a revolution of 150 rpm and subjected to melt-kneading. Then, 5 parts of glycidyl methacrylate and 5 parts of styrene were added from an inlet in the middle of the cylinder, and the resultant mixture was subjected to melt-kneading to provide a modified ethylene-butene copolymer C. Table 1 shows properties of the obtained modified ethylene-butene copolymer C.

(Preparation 4)

100 parts of an ethylene-propylene copolymer (Esprene 201, ethylene content: 49% by weight, density: 0.860 g/cm$^3$, produced by Sumitomo Chemical Co., Ltd.) and 0.5 parts of 1,3-di(t-butylperoxyisopropyl)benzene (one-minute half-life temperature: 175° C.) were fed into a twin screw extruder (product name: TEX44XCT, 44 mmφ, L/D=38.5, produced by The Japan Steel Works, Ltd.) set at a cylinder temperature of 200° C. and a revolution of 150 rpm and subjected to melt-kneading. Then, 5 parts of glycidyl methacrylate and 5 parts of styrene were added from an inlet in the middle of the cylinder, and the resultant mixture was subjected to melt-kneading to provide a modified ethylene-propylene copolymer D. Table 1 shows properties of the obtained modified ethylene-propylene copolymer D.

(Preparation 5)

100 parts of an ethylene-propylene copolymer (Tafmer P0680, ethylene content: 68% by weight, density: 0.870 g/cm$^3$, produced by Mitsui Chemicals, Inc.) and 0.5 parts of 1,3-di(t-butylperoxyisopropyl)benzene (one-minute half-life temperature: 175° C.) were fed into a twin screw extruder (product name: TEX44XCT, 44 mmφ, L/D=38.5, produced by The Japan Steel Works, Ltd.) set at a cylinder temperature of 200° C. and a revolution of 150 rpm and subjected to melt-kneading. Then, 5 parts of glycidyl methacrylate and 5 parts of styrene were added from an inlet in the middle of the cylinder, and the resultant mixture was subjected to melt-kneading to provide a modified ethylene-propylene copolymer E. Table 1 shows properties of the obtained modified ethylene-propylene copolymer E.

TABLE 1

| | | Preparation 1 A | Preparation 2 B | Preparation 3 C | Preparation 4 D | Preparation 5 E |
|---|---|---|---|---|---|---|
| Graft content | (% by weight) | 1.8 | 1.9 | 2.0 | 1.8 | 1.9 |
| DSC | Melting point peak | ° C. | 109 | 140 | 104 | * | * |
| | Enthalpy of crystal fusion ΔH | (J/g) | 1.6 | 4.5 | 20 | — | — |

* No clear melting point was observed as it was amorphous.

Examples 1 to 6 and Comparative Examples 1 to 3
(Table 2)

(1) Preparation of Hot Melt Adhesive Film

Example 1

An adhesive resin composition was obtained by melt-kneading of 80 parts of the modified ethylene-propylene copolymer A obtained in Preparation 1, 20 parts of a hydrogenated styrene-isoprene triblock copolymer (SEPTON 2063, styrene content: 13%, produced by Kuraray Co., Ltd.), and 50 parts of a terpene phenol tackifier (T160, softening point: 160° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (A1). The film was evaluated according to the adhesion evaluation and long-term heat resistance test described below. Table 2 shows the results.

Example 2

An adhesive resin composition was obtained by melt-kneading of 40 parts of the modified ethylene-propylene copolymer B obtained in Preparation 2, 60 parts of a hydrogenated styrene-isoprene triblock copolymer (SEPTON 2063, styrene content: 13%, produced by Kuraray Co., Ltd.), and 50 parts of a terpene phenol tackifier (T160, softening point: 160° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (A2). The film was evaluated according to the adhesion evaluation and long-term heat resistance test described below. Table 2 shows the results.

Example 3

An adhesive resin composition was obtained by melt-kneading of 60 parts of the modified ethylene-propylene copolymer B obtained in Preparation 2, 40 parts of a hydrogenated styrene-isoprene triblock copolymer (SEPTON 2063, styrene content: 13%, produced by Kuraray Co., Ltd.), and 50 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (A3). The film was evaluated according to the adhesion evaluation and long-term heat resistance test described below. Table 2 shows the results.

Example 4

An adhesive resin composition was obtained by melt-kneading of 60 parts of the modified ethylene-propylene copolymer B obtained in Preparation 2, 40 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (A4). The film was evaluated according to the adhesion evaluation and long-term heat resistance test described below. Table 2 shows the results.

Example 5

An adhesive resin composition was obtained by melt-kneading of 80 parts of the modified ethylene-propylene copolymer B obtained in Preparation 2, 20 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (A5). The film was evaluated according to the adhesion evaluation and long-term heat resistance test described below. Table 2 shows the results.

Example 6

An adhesive resin composition was obtained by melt-kneading of 80 parts of the modified ethylene-propylene copolymer B obtained in Preparation 2, 20 parts of a hydrogenated styrene-butadiene random copolymer (Dynaron 1321P, styrene content: 10%, produced by JSR Corporation), and 50 parts of a terpene phenol tackifier (P140, softening point: 140° C., produced by Arakawa Chemical Industries, Ltd.) by the twin screw extruder set at a cylinder temperature of 180° C. The adhesive resin composition was molded into a film having a thickness of 50 μm using a T-die to provide a hot melt adhesive film (A6). The film was evaluated according to the adhesion evaluation and long-term heat resistance test described below. Table 2 shows the results.

Comparative Example 1

An adhesive resin composition was obtained by melt-kneading of 100 parts of the modified ethylene-propylene copolymer B obtained in Preparation 2 and 50 parts of a terpene phenol tackifier (T130, softening point: 130° C., produced by Yasuhara Chemical Co., Ltd.) by a twin screw extruder (product name: TEX44XCT, 44 mmφ, L/D=38.5, produced by The Japan Steel Works, Ltd.) set at a cylinder temperature of 180° C. and a revolution of 150 rpm. The adhesive resin composition was molded into a film having a thickness of 50 μm using a T-die to provide a hot melt adhesive film (B1). The film was evaluated according to the adhesion evaluation and long-term heat resistance test described below. Table 2 shows the results.

Comparative Example 2

An adhesive resin composition was obtained by melt-kneading of 80 parts of the modified ethylene-propylene copolymer B obtained in Preparation 2, 20 parts of a hydrogenated styrene-butadiene random copolymer (Dynaron 1321P, styrene content: 10%, produced by JSR Corporation), and 25 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (B2). The film was evaluated according to the adhesion evaluation and long-term heat resistance test described below. Table 2 shows the results.

Comparative Example 3

An adhesive resin composition was obtained by melt-kneading of 80 parts of the modified ethylene-butene copolymer C obtained in Preparation 3, 20 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) by the twin screw extruder set at a cylinder temperature of 180° C.

The adhesive resin composition was molded into a film having a thickness of 50 μm using a T-die to provide a hot melt adhesive film (B3). The film was evaluated according to the adhesion evaluation and long-term heat resistance test described below. Table 2 shows the results.

Comparative Example 4

An adhesive resin composition was obtained by melt-kneading of 80 parts of the modified ethylene-propylene copolymer D obtained in Preparation 4, 20 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (B4). The film was evaluated according to the adhesion evaluation and long-term heat resistance test described below. Table 2 shows the results.

Comparative Example 5

An adhesive resin composition was obtained by melt-kneading of 80 parts of the modified ethylene-propylene copolymer E obtained in Preparation 5, 20 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) by the twin screw extruder set at a cylinder temperature of 180° C. The adhesive resin composition was molded into a film having a thickness of 50 μm using a T-die to provide a hot melt adhesive film (B5). The film was evaluated according to the adhesion evaluation and long-term heat resistance test described below. Table 2 shows the results.

Comparative Example 6

100 parts of a hydrogenated styrene-isoprene triblock copolymer (SEPTON 2063, styrene content: 13%, produced by Kuraray Co., Ltd.) and 50 parts of a terpene phenol tackifier (T130, softening point: 130° C., produced by Yasuhara Chemical Co., Ltd.) were subjected to melt-kneading by a Labo Plastomill (LABOPLASTOMILL, produced by Toyo Seiki Seisaku-Sho, Ltd.) for 5 minutes at 200° C. and 100 rpm to provide an adhesive resin composition. The adhesive resin composition was molded into a hot melt adhesive film (B6) having a thickness of 50 μm by using a compression molding machine (model: NSF-50, maximum working pressure: 21 MPa, mold clamping force: 50 t, cylinder diameter: 176 mm, stroke: 200 mm, produced by SHINTO Metal Industries Corporation) under the press conditions: at 220° C. under no pressure for 3 minutes; then at 220° C. and 5 MPa for 3 minutes; and then at room temperature (water-cooling) and 5 MPa for 3 minutes. The film was evaluated according to the adhesion evaluation and long-term heat resistance test described below. Table 2 shows the results.

Comparative Example 7

80 parts of the ethylene-propylene copolymer (Versify V 3401.05, ethylene content: 15% by weight, density: 0.863 g/cm³, produced by The Dow Chemical Company) used in Preparation 2, 20 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) were subjected to melt-kneading by the twin screw extruder set at a cylinder temperature of 180° C. to provide an adhesive resin composition. The adhesive resin composition was molded into a film having a thickness of 50 μm by using a T-die to provide a hot melt adhesive film (B7). The film was evaluated according to the adhesion evaluation and long-term heat resistance test described below. Table 2 shows the results.

Comparative Example 8

20 parts of the modified ethylene-propylene copolymer B obtained in Preparation 2, 30 parts of an ethylene-butene copolymer (EXCELLEN CX5508, melting point: 79° C., produced by Sumitomo Chemical Co., Ltd.), 50 parts of a hydrogenated styrene-butadiene random copolymer (Dynaron 1321P, styrene content: 10%, produced by JSR Corporation), and 50 parts of a terpene phenol tackifier (T130, softening point: 130° C., produced by Yasuhara Chemical Co., Ltd.) were subjected to melt-kneading by the twin screw extruder set at a cylinder temperature of 180° C. to provide an adhesive resin composition. The adhesive resin composition was molded into a film having a thickness of 50 μm by using a T-die to provide a hot melt adhesive film (B8). The film was evaluated according to the adhesion evaluation and long-term heat resistance test described below. Table 2 shows the results.

(2) Adhesion Evaluation and Long-Term Heat Resistance Test (Heat Resistance Test at 110° C.)

The obtained adhesive film was laminated onto an ABS resin sheet having a thickness of 0.3 mm using a laminator (LAMIPACKER LPD3204 produced by FUJIPLA Inc.) at a heating temperature of 130° C., a speed of 1.0 m/min to provide an adhesive-backed covering material. Then, the covering material was heated to 120 to 130° C. and bonded to a PC/ABS plate by vacuum pressure molding. The obtained laminate was cut into 25 mm width. The strength (N/25 mm) and failure mode were then tested by peeling the covering material in the 90 degree direction relative to the molded article at 23° C. and a tensile speed of 100 mm/min. The failure mode is expressed as material failure (breakage of the ABS resin sheet as the covering material) or interfacial delamination (delamination of the adhesive layer from its interface with the PC/ABS plate as the molded article). Also, the adhesive-backed covering material was bonded to a container lid-shaped molded article made of AS resin (a rectangular-shaped product (length: 60 mm, width: 75 mm) with four rounded corners (30 mmR), provided that the planar top surface and each of the four side surfaces form a corner of 20 mmR, and that the vertex of the planar top surface is provided with an inverse taper (60 mmR)) by vacuum pressure molding. Cross cut (3 cm) was carried out at a vertex of the resultant laminate at which the R portion of the side surface and the inverse taper intersected. The laminate was then allowed to stand still in an oven set at 110° C. for 48 hours. The cross-cut portion was observed to determine whether it was open or not and the result was used as an index of heat resistance. The heat resistance was evaluated based on the following rating criteria:

cross mark (bad rating): an opening of 0.5 mm or larger was observed;

open circle (acceptable rating): an opening of smaller than 0.5 mm was observed;

double circles (good rating): no opening was observed.

TABLE 2

|  | Examples | | | | | | Comparative Examples | | |
|---|---|---|---|---|---|---|---|---|---|
|  | 1<br>A1 | 2<br>A2 | 3<br>A3 | 4<br>A4 | 5<br>A5 | 6<br>A6 | 1<br>B1 | 2<br>B2 | 3<br>B3 |
| Modified ethylene-propylene copolymer A | 80 | | | | | | | | |
| Modified ethylene-propylene copolymer B | | 40 | 60 | 60 | 80 | 80 | 100 | 80 | |
| Modified ethylene-propylene copolymer C | | | | | | | | | 80 |
| Modified ethylene-propylene copolymer D | | | | | | | | | |
| Modified ethylene-propylene copolymer E | | | | | | | | | |
| Unmodified ethylene-propylene copolymer[1] | | | | | | | | | |
| Unmodified ethylene-butene copolymer[2] | | | | | | | | | |
| Hydrogenated styrene-isoprene triblock copolymer[3] | 20 | 60 | 40 | | | | | | |
| Hydrogenated styrene-butadiene random copolymer[4] | | | | 40 | 20 | 20 | | 20 | 20 |
| Hydrogenated styrene-isoprene triblock copolymer[5] | | | | | | | | | |
| Tackifier[6] | | | | 50 | 50 | | 50 | 25 | 50 |
| Tackifier[7] | | 50 | 50 | | | | | | |
| Tackifier[8] | | | | | | 50 | | | |
| Adhesion evaluation ABS-PC/ABS — Peeling at 90 degrees N/25 mm | >40 | >40 | >40 | >40 | >40 | >40 | 11 | 13 | 10 |
| Adhesion evaluation ABS-PC/ABS — Failure mode | Material failure | Material failure | Material failure | Material failure | Material failure | Material failure | Interfacial delamination | Interfacial delamination | Interfacial delamination |
| Heat resistance test at 110° C. | ○ | ○ | ◎ | ◎ | ◎ | ◎ | ○ | ○ | X |

|  | Comparative Examples | | | | |
|---|---|---|---|---|---|
|  | 4<br>B4 | 5<br>B5 | 6<br>B6 | 7<br>B7 | 8<br>B8 |
| Modified ethylene-propylene copolymer A | | | | | |
| Modified ethylene-propylene copolymer B | | | | | 20 |
| Modified ethylene-propylene copolymer C | | | | | |
| Modified ethylene-propylene copolymer D | 80 | | | | |
| Modified ethylene-propylene copolymer E | | 80 | | | |
| Unmodified ethylene-propylene copolymer[1] | | | | 80 | |
| Unmodified ethylene-butene copolymer[2] | | | | | 30 |
| Hydrogenated styrene-isoprene triblock copolymer[3] | | | 100 | | |
| Hydrogenated styrene-butadiene random copolymer[4] | 20 | 20 | | 20 | 50 |
| Hydrogenated styrene-isoprene triblock copolymer[5] | | | | | |
| Tackifier[6] | 50 | 50 | 50 | 50 | 50 |
| Tackifier[7] | | | | | |
| Tackifier[8] | | | | | |
| Adhesion evaluation ABS-PC/ABS — Peeling at 90 degrees N/25 mm | 30 | 23 | 40 | 10 | 30 |
| Adhesion evaluation ABS-PC/ABS — Failure mode | Interfacial delamination | Interfacial delamination | Interfacial delamination | Interfacial delamination | Interfacial delamination |
| Heat resistance test at 110° C. | X | X | X | ○ | X |

[1] Versify V 3401.05, produced by The Dow Chemical Company
[2] Excellen, produced by Sumitomo Chemical Co., Ltd.
[3] SEPTON 2063, produced by Kuraray Co., Ltd.
[4] Dynaron 1321P, produced by JSR Corporation.
[5] SEPTON 2002, produced by Kuraray Co., Ltd.
[6] YS Polyster T130, produced by Yasuhara Chemical Co., Ltd.
[7] YS Polyster T160, produced by Yasuhara Chemical Co., Ltd.
[8] Arkon P140, produced by Arakawa Chemical Industries, Ltd.

Examples 7 to 9 (Table 3)

(1) Preparation of Adhesive Film

The hot melt adhesive films A4 to A6 obtained in Examples 4, 5, and 6 were respectively used in Examples 7, 8, and 9. The films were evaluated according to the adhesion test described below. Table 3 shows the results.

(2) Adhesion Evaluation

The obtained hot melt adhesive film was laminated onto an ABS resin sheet having a thickness of 0.3 mm using a laminator (LAMIPACKER LPD3204 produced by FUJIPLA Inc.) at a heating temperature of 130° C. and a speed of 1.0 m/min to provide an adhesive-backed covering material. Then, the covering material was heated to 120 to 130° C. and bonded to a polypropylene plate by vacuum pressure bonding.

The obtained laminate was cut into 25 mm width. The strength (N/25 mm) and failure mode then were tested by peeling the covering material in the 90 degree direction relative to the molded article at 23° C. and a tensile speed of 100 mm/min. In all of the examples, breakage of the covering material was observed.

TABLE 3

|  |  | Examples | | |
| --- | --- | --- | --- | --- |
|  |  | 7 A4 | 8 A5 | 9 A6 |
| Modified ethylene-propylene copolymer B |  | 60 | 80 | 80 |
| Hydrogenated styrene-butadiene random copolymer[1] |  | 40 | 20 | 20 |
| Tackifier[2] |  | 50 | 50 |  |
| Tackifier[3] |  |  |  | 50 |
| Adhesion evaluation ABS-PP | Peeling at 90 degrees N/25 mm | >40 | >40 | >40 |
|  | Failure mode | Material failure | Material failure | Material failure |

[1] Dynaron 1321P, produced by JSR Corporation
[2] YS Polyster T130, produced by Yasuhara Chemical Co., Ltd.
[3] Arkon P140, produced by Arakawa Chemical Industries, Ltd.

The invention claimed is:

1. An adhesive resin composition, essentially comprising:
a base resin which comprises
(A) 30 to 90 parts by weight of a modified ethylene-propylene copolymer, and
(B) 70 to 10 parts by weight of a styrene thermoplastic elastomer, provided that (A)+(B) equals 100 parts by weight; and
(C) a tackifier in an amount of 30 to 60 parts by weight per 100 parts by weight of the base resin,
the modified ethylene-propylene copolymer being one which has been graft-modified with (a) an unsaturated carboxylic acid or a derivative thereof and (b) an aromatic vinyl monomer, comprises 0.1% to 5% by weight of (a) the unsaturated carboxylic acid or the derivative thereof, and has a melting point peak in a range of 100 to 150° C. with an enthalpy of crystal fusion of 0.5 to 10 J/g sas determined by DSC.

2. The adhesive resin composition according to claim 1, wherein the modified ethylene-propylene copolymer is obtained by modification of an ethylene-α-olefin copolymer having a density of 0.85 g/cm³ to 0.87 g/cm³.

3. The adhesive resin composition according to claim 1, wherein the ethylene-propylene copolymer to be graft-modified has an ethylene content 10% to 20% by weight.

4. The adhesive resin composition according to claim 1, wherein the styrene thermoplastic elastomer has a styrene content of 20% by weight or less.

5. The adhesive resin composition according to claim 1, wherein the styrene thermoplastic elastomer is at least one selected from the group consisting of hydrogenated styrene-isoprene block copolymers, hydrogenated styrene-hutadien block copolymers, and hydrogenated styrene-butadiene random copolymers.

6. The adhesive resin composition according to claim 1, wherein the tackifier has a ring and ball softening point of 90 to 160° C.

7. A sheet- or film-shaped molded product, comprising the adhesive resin composition according to claim 1.

8. A laminate, obtained by bonding at least one adhesive resin composition according to claim 1 and/or the sheet- or shaped molded product comprising the adhesive resin composition to at least one selected from the group consisting of polyolefin resins, styrene resins, polycarbonate resins, acrylic resins, polyamide resins, polyester resins, and metallic materials.

9. The laminate according to claim 8, comprising a covering material and a molded article which are bonded together in contact with said at least one adhesive resin composition and/or the sheet- or film-shaped molded product comprising the adhesive resin composition, the covering material being folded around an edge of the molded article toward the backside of the molded article.

10. The laminate according to claim 8, wherein a covering material is bonded to a molded article having a curved edge with said at least one adhesive resin composition and/or the sheet- or film-shaped molded product comprising the adhesive resin composition.

11. The laminate according to claim 8, wherein a covering material is bonded to a molded article having a curved edge with said at least one adhesive resin composition and/or the sheet- or film-shaped molded product comprising the adhesive resin composition, and wherein the covering material is folded around an edge of the molded article toward the backside of the molded article.

12. The adhesive resin composition according to claim 1, wherein the melting point peak of the modified ethylene-propylene copolymer (A) is within a range of 110 to 150°C.

13. The adhesive resin composition according to claim 1, wherein the enthalpy of crystal fusion is 2.5 to 10 J/g as determined by DSC.

14. The adhesive resin composition according to claim 1, wherein the base resin comprises 60 to 80 parts by weight of the modified ethylene-propylene copolymer (A) and 40 to 20 parts by weight of the styrene thermoplastic elastomer (B).

* * * * *

UNITED STATES PATENT AND TRADEMARK OFFICE
CERTIFICATE OF CORRECTION

| | | |
|---|---|---|
| PATENT NO. | : 9,328,271 B2 | Page 1 of 2 |
| APPLICATION NO. | : 13/641182 | |
| DATED | : May 3, 2016 | |
| INVENTOR(S) | : Yasunori Okada et al. | |

It is certified that error appears in the above-identified patent and that said Letters Patent is hereby corrected as shown below:

In the claims:

Column 19 Line 35
Change
"sas"

To be

--as--

Column 19 Line 42
Change
"10%"

To be

--of 10%--

Column 20 Line 1
Change
"hutadien"

To be

--butadiene--

Column 20 Line 9
Change
"sheet- or"

To be

--sheet- or film- --

Signed and Sealed this
Second Day of August, 2016

Michelle K. Lee
*Director of the United States Patent and Trademark Office*

CERTIFICATE OF CORRECTION (continued)
U.S. Pat. No. 9,328,271 B2

In the claims:

Column 20 Lines 15-16
Change
"cover-inc"

To be

--cover-ing--